(12) United States Patent
Jeffrey et al.

(10) Patent No.: US 7,492,371 B2
(45) Date of Patent: Feb. 17, 2009

(54) HARDWARE ANIMATION OF A BOUNCING IMAGE

(75) Inventors: Eric Jeffrey, Richmond (CA); Barinder Singh Rai, Surrey (CA)

(73) Assignee: Seiko Epson Corporation, Tokyo (JP)

( * ) Notice: Subject to any disclaimer, the term of this patent is extended or adjusted under 35 U.S.C. 154(b) by 316 days.

(21) Appl. No.: 11/293,001

(22) Filed: Dec. 2, 2005

(65) Prior Publication Data

US 2007/0126748 A1 Jun. 7, 2007

(51) Int. Cl.
G09G 5/36 (2006.01)
(52) U.S. Cl. ...................... 345/559; 345/474
(58) Field of Classification Search ................ 345/559, 345/474
See application file for complete search history.

(56) References Cited

U.S. PATENT DOCUMENTS

| 4,897,803 | A | * | 1/1990 | Calarco et al. | 345/561 |
|---|---|---|---|---|---|
| 4,954,970 | A | * | 9/1990 | Walker et al. | 345/639 |
| 5,083,119 | A | * | 1/1992 | Trevett et al. | 345/559 |
| 5,283,867 | A | * | 2/1994 | Bayley et al. | 345/563 |
| 5,333,261 | A | * | 7/1994 | Guttag et al. | 345/501 |
| 5,517,611 | A | * | 5/1996 | Deering | 345/503 |
| 5,675,773 | A | * | 10/1997 | Devic | 345/522 |
| 5,777,631 | A | * | 7/1998 | Greene et al. | 345/546 |
| 5,805,133 | A | * | 9/1998 | Priem et al. | 345/686 |
| 5,838,334 | A | * | 11/1998 | Dye | 345/503 |
| 5,844,569 | A | * | 12/1998 | Eisler et al. | 345/619 |
| 5,877,741 | A |   | 3/1999 | Chee et al. | |
| 6,373,493 | B1 | * | 4/2002 | Rickard et al. | 345/542 |
| 6,525,738 | B1 | * | 2/2003 | Devins et al. | 345/553 |
| 6,762,762 | B2 | * | 7/2004 | MacInnis et al. | 345/503 |
| 2004/0041845 | A1 | * | 3/2004 | Alben et al. | 345/846 |
| 2004/0095355 | A1 | * | 5/2004 | Koker et al. | 345/520 |
| 2005/0060669 | A1 | * | 3/2005 | Lowles | 715/867 |
| 2005/0122335 | A1 | * | 6/2005 | MacInnis et al. | 345/520 |

FOREIGN PATENT DOCUMENTS

EP 1 517 289 A1 3/2005

\* cited by examiner

*Primary Examiner*—Xiao M Wu
*Assistant Examiner*—Edward Martello
(74) *Attorney, Agent, or Firm*—Mark P. Watson

(57) ABSTRACT

A graphics controller for animating an overlay is described. The graphics controller includes a host interface for communicating with an external processor and a plurality of registers in communication with the host interface. Logic is configured to periodically change coordinates of an overlay image. The logic responds to values stored in the registers to cause display registers containing the coordinates to be updated every x number of frame refreshes, wherein x is a positive integer.

20 Claims, 5 Drawing Sheets

HARDWARE ANIMATION OF A BOUNCING IMAGE

BACKGROUND

Battery operated devices having a graphical display are increasingly popular. Cell phones, MP3 players, global positioning satellite (GPS) receivers, personal data assistants, and hand-held video games, are a few examples of such devices incorporating a graphical display made up of a two-dimensional matrix of pixels.

As more such devices enter the market, it is increasingly important to provide increased capability and functionality to provide distinguishing characteristics. Unfortunately, many functional improvements require increased computer processing, which adversely affects power consumption and battery life. It would therefore be desirable to provide enhanced functionality without significantly impacting battery performance.

Screen savers are known to be popular among consumers of battery operated devices incorporating a graphical screen. Although, in the context of a liquid crystal display (LCD), screen savers may not actually prevent harm to the display screen, they do provide eye-catching animations. In the context of other displays, however, such as cathode ray tube (CRT) and plasma screens, screen savers can truly prevent image burn-in by changing the displayed image from a static image to a dynamic one.

Unfortunately, while screen savers are known for use with cell phones and other devices, they require significant processing time and therefore adversely affect battery life. It would therefore be desirable to provide a capability for an eye-catching dynamic screen saver display without utilizing significant processor time.

SUMMARY

Broadly speaking, the present invention fills these needs by providing a graphics controller for animating a bouncing image.

It should be appreciated that the present invention can be implemented in numerous ways, including as a process, an apparatus, a system, a device, or a method. Several inventive embodiments of the present invention are described below.

In one embodiment, a graphics controller for animating an overlay is provided. The graphics controller includes a host interface for communicating with an external processor and a plurality of registers in communication with the host interface. Logic circuitry is configured to periodically change coordinates of an overlay image. The logic responds to values stored in the registers to cause display registers containing the coordinates to be updated every x number of frame refreshes, wherein x is a positive integer.

In another embodiment, a hardware-implemented method for animating a bouncing image is provided. In the method, a plurality of registers containing values defining an animation is read. Periodically, coordinates of an overlay image are changed in response to the values. The coordinates are changed by updating display registers storing the coordinates every x number of frame refreshes, wherein x is a positive integer.

In yet another embodiment, a method for causing an animation is provided wherein an overlay image moves over a background image. In the method, background image data and overlay image data are loaded into an image memory of a graphics controller. The background image data defines a background image and the overlay image data defines an overlay image. Values defining an animation are loaded into a plurality of registers. The registers are read and coordinates of the overlay image are periodically changed in response to the values. The coordinates are changed by updating display registers storing the coordinates every x number of frame refreshes, wherein x is a positive integer. The image data is read selectively from the background image data and the overlay image data to generate a composite image wherein the overlay image is positioned at the coordinates over the background image. An external display is driven via a display interface to display the composite image.

The advantages of the present invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

In the following description, numerous specific details are set forth in order to provide a thorough understanding of the present invention. However, it will be apparent to those skilled in the art that the present invention may be practiced without some of these specific details. In other instances, well known process operations and implementation details have not been described in detail in order to avoid unnecessarily obscuring the invention.

Figure 1:
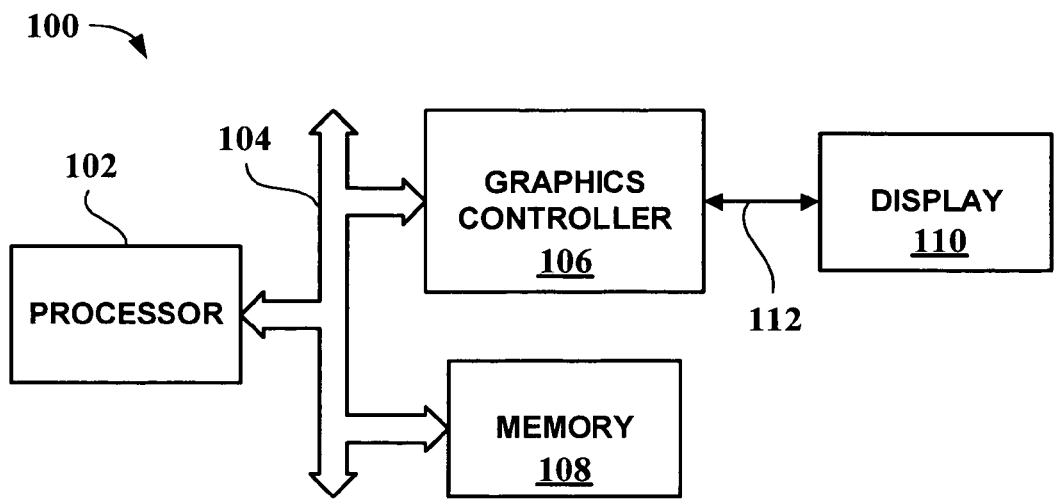
FIG. 1 is an illustration showing a high-level architecture of a device for displaying graphical information.

FIG. 1 is an illustration showing a high-level architecture of a device 100 for displaying graphical information. The device includes a processor 102 in communication with a graphics controller 106 and memory 108 over a bus 104. The graphics controller 106 provides an interface between display processor 102 and display 110.

The timing control signals and data lines between graphics controller 106 and display 110 are shown generally as line 112. These may in fact be several separate address, data and control lines but are shown generally as line 112, which may be referred to as a bus. It should be recognized that such data pathways may represented throughout the figures as a single line. Processor 102 performs digital processing operations and communicates with graphics controller 106 and memory 108 over bus 104. In other embodiments, processor 102 communicates over several address, data, and control lines.

In addition to the components mentioned above and illustrated in FIG. 1, those skilled in the art will recognize that there may be many other components incorporated into device 100, consistent with the application. For example, if device 100 is a cell phone, then wireless network interface, random access memory (RAM), digital-to-analog and analog-to-digital converters, amplifiers, keypad input, and so forth will be provided. Likewise, if device 100 is a personal data assistant (PDA), various hardware consistent with providing a PDA will be included in device 100. It will therefore be understood that FIG. 1 is not intended to be limiting, but rather to present those components directly related to novel aspects of the device.

Processor 102 performs digital processing operations and communicates with graphics controller 106. In one embodiment, processor comprises an integrated circuit capable of executing instructions retrieved from memory 108. These instructions provide device 100 with functionality when executed on processor 102. Processor 102 may also be a digital signal processor (DSP) or other processing device.

Memory 108 may be internal or external random-access memory or non-volatile memory. Memory 108 may be non-removable memory such as flash memory or other EEPROM, or magnetic media. Alternatively, memory 108 may take the form of a removable memory card such as ones widely available and sold under such trademarks as "SD Card," "Compact Flash," and "Memory Stick." Memory 108 may also be any other type of machine-readable removable or non-removable media. Memory 108 may be remote from device 100. For example, memory 108 may be connected to device 100 via a communications port (not shown), where a BLUETOOTH® interface or an IEEE 802.11 interface, commonly referred to as "Wi-Fi," is included. Such an interface may connect imaging device 100 with a host (not shown) for transmitting data to and from the host. If device 100 is a communications device such as a cell phone, it may include a wireless communications link to a carrier, which may then store data in hard drives as a service to customers, or transmit data to another cell phone or email address. Memory 108 may be a combination of memories. For example, it may include both a removable memory card for storing image data, and a non-removable memory for storing data and software executed by processor 102.

Figure 2:
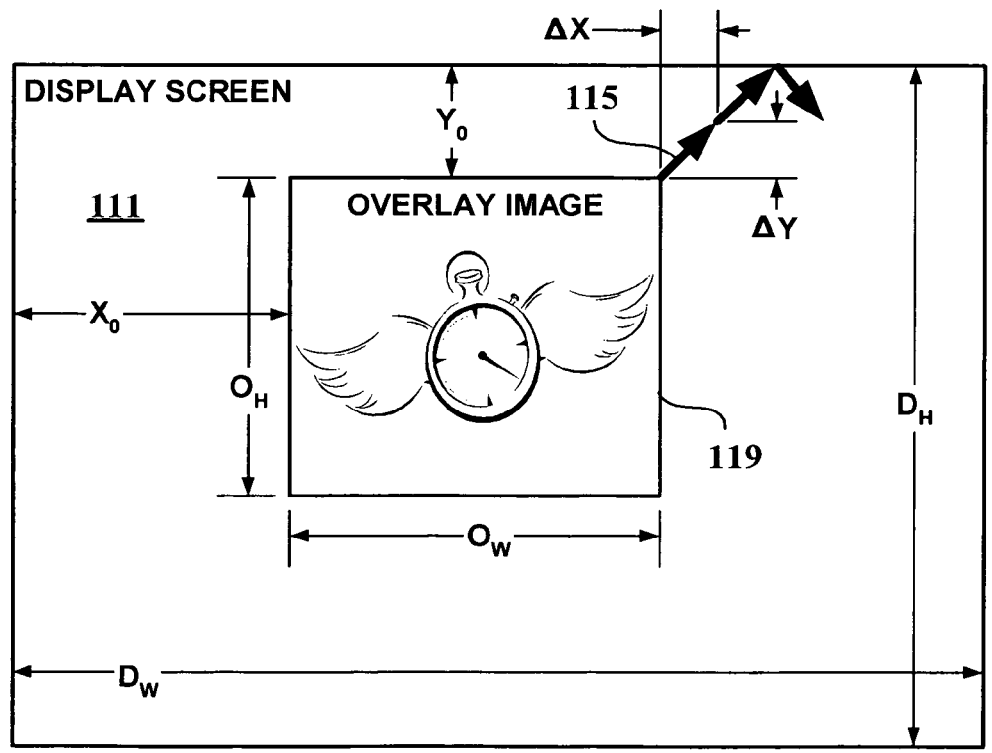
FIG. 2 shows an exemplary display screen having an overlay image animated so that it bounces within the display screen.

Display 110 can be any form of display capable of displaying a digital image. In one embodiment, display 110 comprises a liquid crystal display (LCD). However, other types of displays are available or may become available that are capable of displaying an image that may be used in conjunction with device 100. FIG. 2 shows an exemplary display screen 111 having an overlay image 119 animated so that it bounces within display screen 111. In this example, overlay image 119 moves in the direction indicated by arrow 115 defined by $\Delta X$ and $\Delta Y$. When overlay image 119 reaches the top edge of display screen 111, $\Delta Y$ is multiplied by negative one (−1) causing overlay image 119 to "bounce" off the side of display screen 111. Overlay image 119 continues in this manner, bouncing inside display screen 111, causing a screen-saving animation to occur. Various dimensions identified in FIG. 2 are described in Table 1 below.

Figure 3:
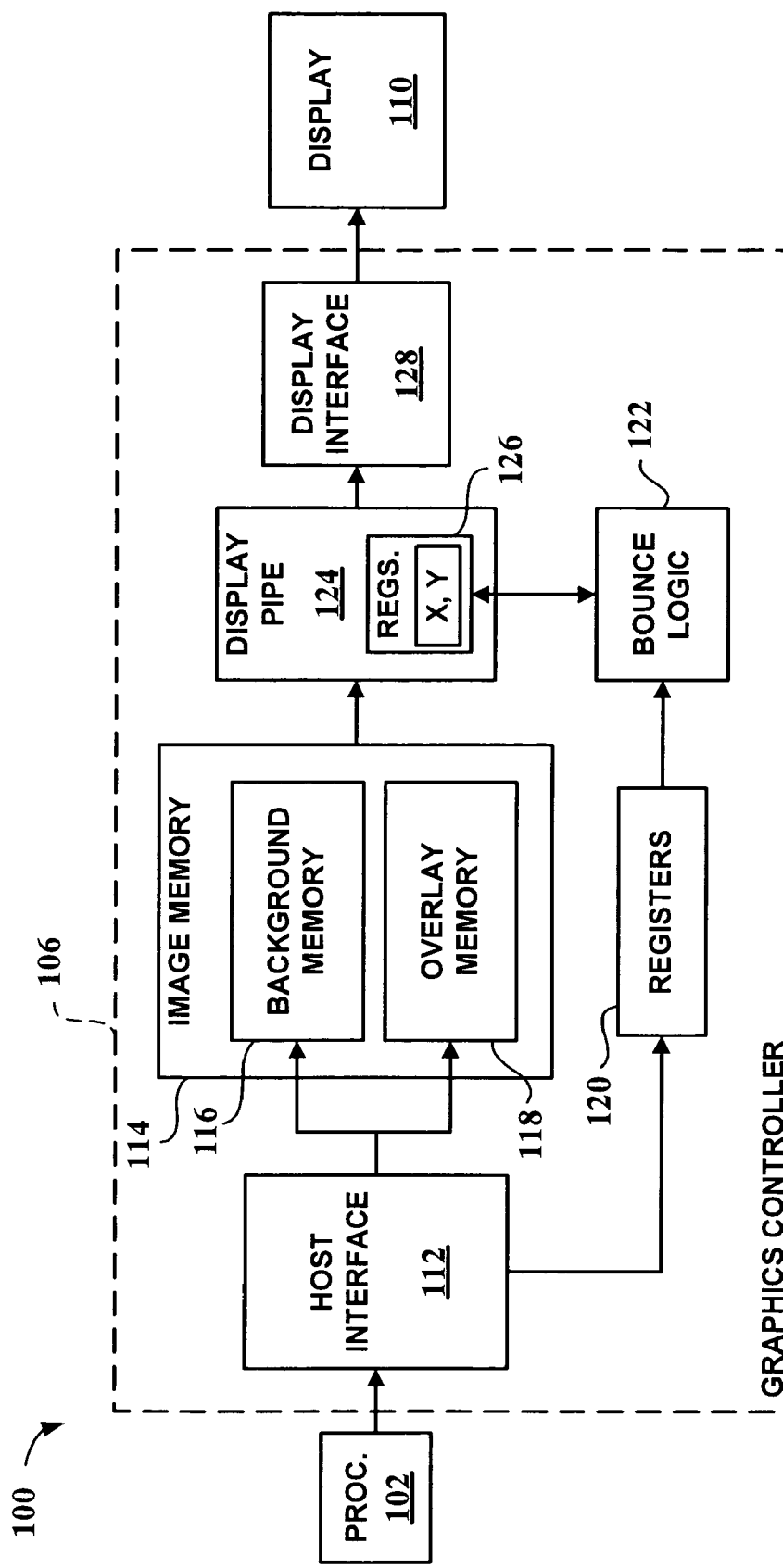
FIG. 3 shows an exemplary embodiment of a graphics controller.

FIG. 3 shows an exemplary embodiment of graphics controller 106. Graphics controller 106 is an electronic device including logic that may, for example, be implemented in an application-specific integrated circuit (ASIC), a field programmable gate array (FPGA), or otherwise implemented in hardware. Therefore, graphics controller 106 comprises logic formed from logic gates, and may not require software instructions to operate.

Processor 102 is in communication with host interface 112, which receives data and address information and passes the information to the appropriate locations in graphics controller 106. Image memory 114 includes a background memory 116 for containing data describing a background image and an overlay memory 118 for containing data describing an overlay image. Display pipe 124 retrieves data during each frame refresh from image memory 114 and passes the data to display interface 128, which then passes the data to display 110 in the generally known manner. Display pipe 124 includes internal display registers 126 which direct display pipe 124 to draw data either from background memory 116 or overlay memory 118, as will be described in more detail below.

Graphics controller 106 further includes a plurality of registers 120. As will be understood by those skilled in the art, registers 120 may be distributed throughout graphics controller, or may be collected in a single register block. Finally, graphics controller 106 includes bounce logic 122 for modifying display registers 126 to cause the overlay image to be repositioned every n number of frame refreshes, thereby animating the overlay image to cause it to appear to bounce inside the display. This operation of the bounce logic is described in more detail below with reference to FIGS. 5 and 6.

Registers 120 are addressable by processor 102, which can load registers 120 with values that control the operation of bounce logic 122. Table 1 shows exemplary values for registers 120, which are further illustrated in FIG. 2. Values $X_0$ and $Y_0$ represent starting positions of the upper left corner of the overlay image. In one embodiment, the upper left corner of the display is identified as the origin, with the x- and y-coordinate values increasing to the right and down, respectively. However, any coordinate system can be implemented. Register values $D_W$ and $D_H$ identify the width and height of a display region. In one embodiment, the display region covers the entire display. However, it is also possible that the display region is selected to only cover a portion of the display. The register values $O_W$ and $O_H$ identify the width and height, respectively, of the overlay graphic. Register values $\Delta X$ and $\Delta Y$ identify the amount that the position of the overlay is incremented with each update of the values X and Y, which are stored in display registers 126. $\Delta X$ and $\Delta Y$ may be a negative integer, a positive integer, or zero. Together $\Delta X$ and $\Delta Y$ identify the direction of movement of the animated overlay, as represented by arrow 115 in FIG. 2. For example, by setting $\Delta X$ to zero and $\Delta Y$ to one, the overlay will bounce up and down only. Finally, register value n allows for the speed of movement to be modified by changing the number of frame refreshes between each update of the overlay position.

TABLE 1

| Symbol | Description |
|---|---|
| $X_0$ | X start position - number of pixels from left edge of the display to the left edge of the initial position of the overlay |
| $Y_0$ | Y start position - number of pixels from the top edge of the display to the top edge of the imtial position of the overlay |
| $D_W$ | Display width |
| $D_H$ | Display height |
| $O_W$ | Overlay width |
| $O_H$ | Overlay height |
| $\Delta Y$ | Rise - Number of pixels to move overlay vertically each n frame refreshes |
| $\Delta X$ | Run - Number of pixels to move overlay horizontally each n frame refreshes |

TABLE 1-continued

| Symbol | Description |
|---|---|
| n | Speed - Number of frame refreshes between each X, Y update; a value of zero causing the overlay to remain stationary |

Figure 4:
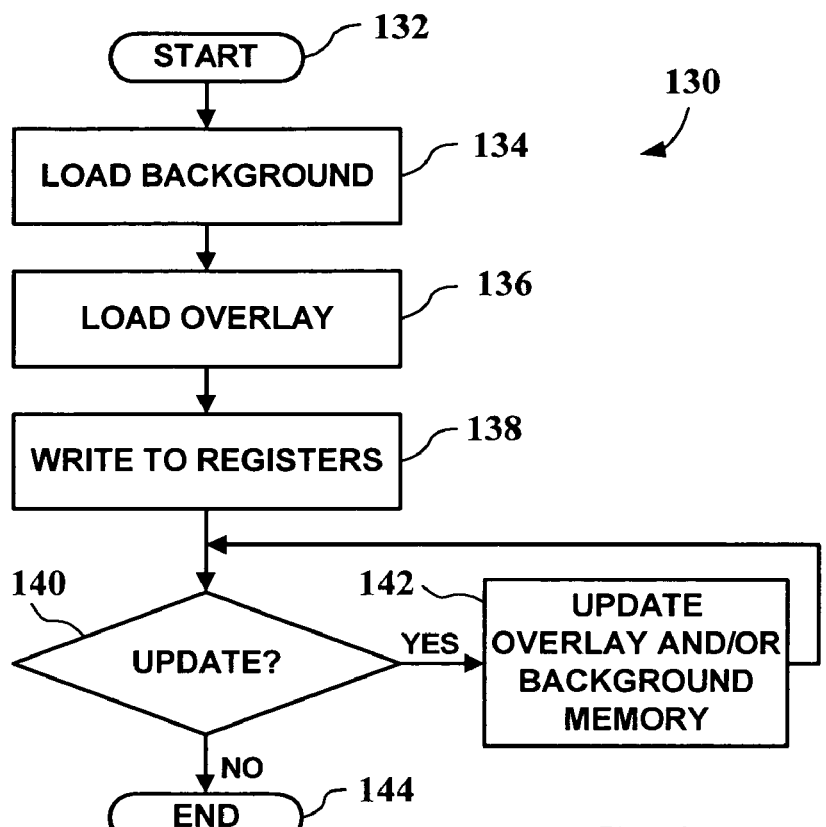
FIG. 4 shows a flow chart illustrating an exemplary procedure executed by a processor for causing an overlay image to bounce in a display over a background image using the graphics controller of FIG. 3.

FIG. 4 shows a flow chart 130 illustrating an exemplary procedure executed by processor 102 for causing an overlay image to bounce in a display over a background image using the graphics controller of FIG. 3. The procedure begins as indicated by start block 132 and proceeds to operation 134 wherein background image data is loaded into background memory 116. In other words, processor 102 populates the background memory 116 of image memory 114 with image data. This image data will produce a background image over which the overlay image can move. After the background image data is loaded, the procedure flows to operation 136, in which overlay image data is loaded into overlay memory 118 with image data from processor 102. After the overlay image data is loaded, the procedure flows to operation 138.

In operation 138, processor 102 writes to registers 120. Exemplary register values are provided above in Table 1. It should be recognized that not all values mentioned above in Table 1 are required and further, that other registers may be provided to provide additional functionality. For example, some register values may be hard-wired into bounce logic 122 rather than provide register values. For example, the start position $(X_0, Y_0)$ may be hardwired to always be (0, 0). It is also contemplated that other register values may be added to provide additional functionality. Additional registers could include, for example, a background color value to use instead of a background image, a bit to cause the overlay image to fly across the image instead of bounce, a bit to cause the overlay image to wrap around the display. Many other possibilities will occur to those skilled in the art. After writing to registers 120, the procedure flows to operation 140.

In operation 140, it is determined whether the background image or overlay image are to be updated. If so, then the procedure flows to operation 142 wherein, at the appropriate time or interval, the overlay and/or background images are updated by loading new image data to image memory 114. This allows, for example, an overlay image of a clock to be updated every minute. After updating the display memory, the procedure flows back to operation 140 to determine if additional updates are to be provided.

If, in operation 140, no updates are needed, then the procedure ends as indicated by end block 144. As shown by flowchart 130, only minimal use of processor 102 is required to set up the animation. The background and overlay images are loaded and the registers are set. Those skilled in the art will recognize that the order of operation outlined in flowchart 130 may be modified in various ways without affecting the result. Once this is accomplished, bounce logic 122 automatically, and with minimal power consumption, animates the overlay to make it appear to bounce inside the display over the background image. Further details of the operation of bounce logic 122 will now be described with reference to FIGS. 5 and 6.

Figure 5:
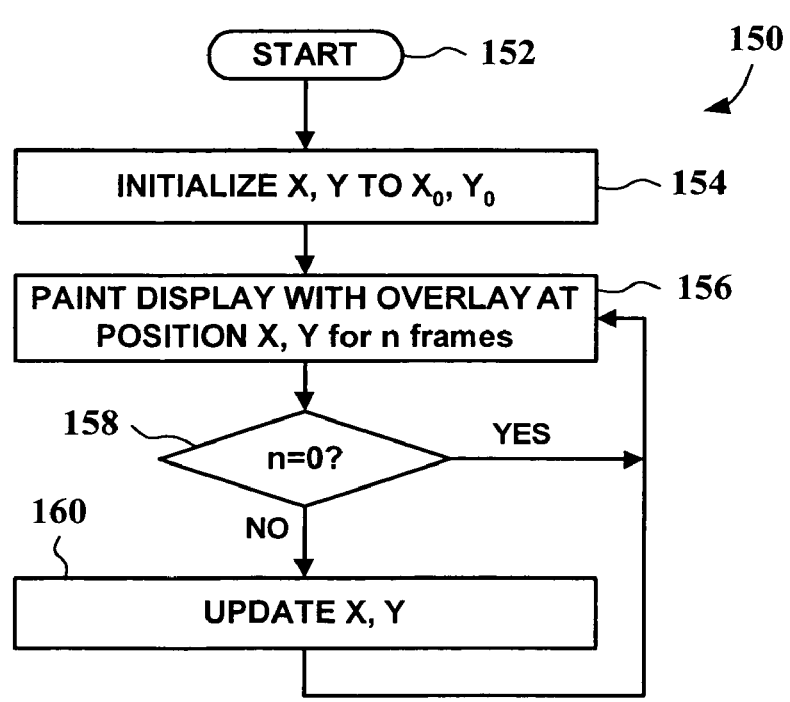
FIG. 5 shows a flowchart that illustrates a procedure for animating a bouncing image.

FIG. 5 shows a flowchart 150 that illustrates a procedure for animating a bouncing image. The procedure begins as indicated by start block 152 and proceeds to operation 154 wherein values X and Y are initialized to the values $X_0$ and $Y_0$ from registers 120. As illustrated in FIG. 3, display pipe 124 includes display registers 126 containing the values X, Y, which are initialized and later updated by bounce logic 122 between frame refreshes. After initializing X and Y, the procedure flows to operation 156.

In operation 156, bounce logic 122 controls display pipe 124 to read image data from background memory 116 and overlay memory 118 to provide a composite image having the overlay painted at location X, Y and background in regions of the display not covered by the overlay. In one embodiment, the values held by display registers 126, including X and Y, are used to identify whether the next image data value is drawn from background memory 116 or overlay memory 118 of FIG. 3, in a manner understood by those skilled in the art. The overlay and background images are painted for n number of frame refreshes, where n is stored in registers 120 of FIG. 3 as discussed above with reference to Table 1. If n equals zero, then the frame is painted for a single frame, for example. After the display is painted, n frame refreshes elapse, the procedure flows to operation 158, in which it is determined whether n equals zero. If n equals zero, then the procedure returns to operation 156 and effectively operation 160 is skipped. If n does not equal zero, then the procedure flows to operation 160.

In operation 160, the values X and Y, located in display registers 126 of FIG. 3, are updated by bounce logic 122 of FIG. 3. Details of how X and Y are updated are discussed below with reference to FIG. 6. Effectively, X and Y are incremented and/or decremented by $\Delta X$ and $\Delta Y$ to reposition overlay image 119 as shown in FIG. 2. After updating X and Y, the procedure returns to operation 156. In one embodiment, a control bit (not shown) is available to enable or disable bounce logic 122.

Figure 6:
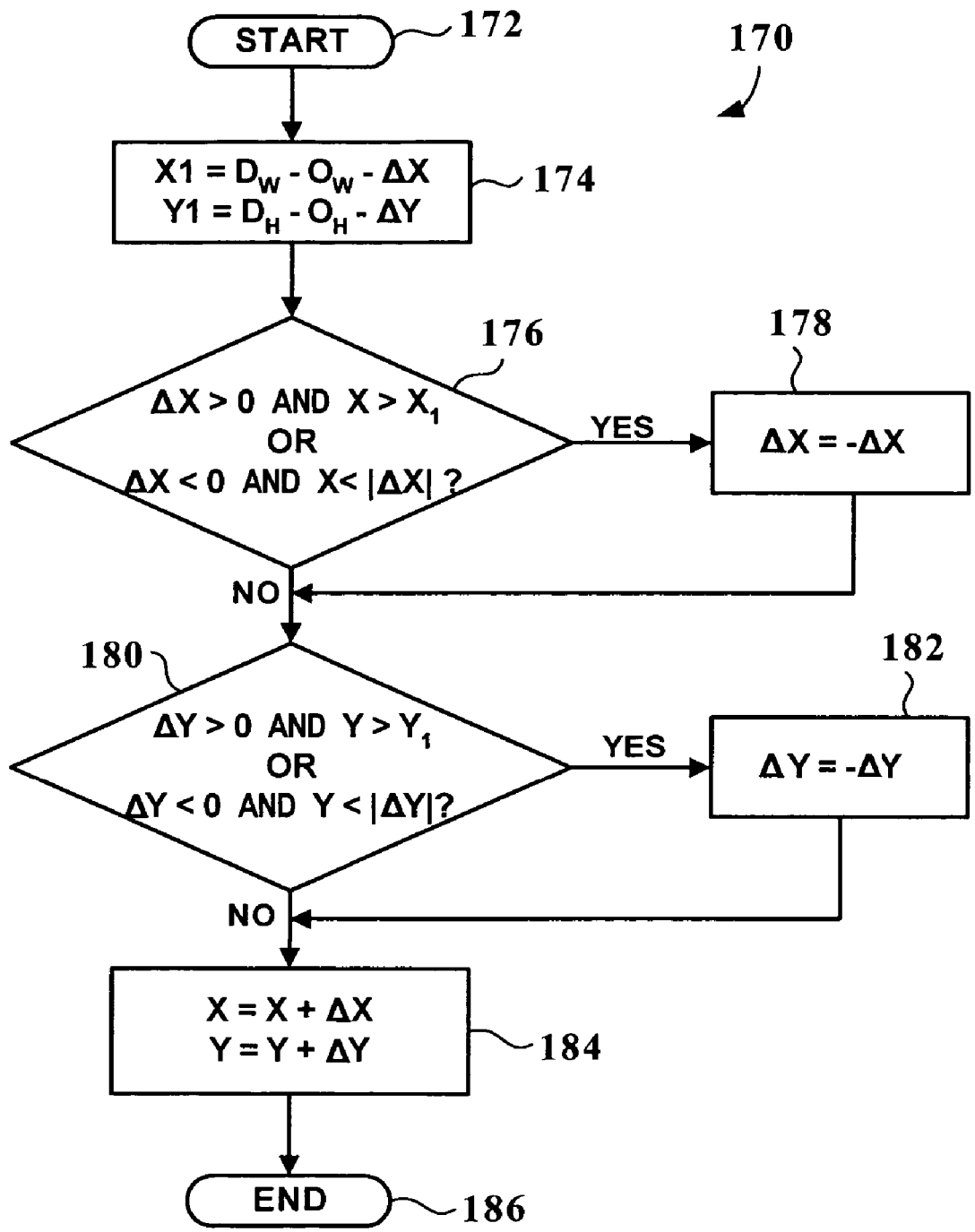
FIG. 6 shows a flowchart illustrating a procedure for updating X and Y coordinates of an overlay image

FIG. 6 shows a flowchart 170 illustrating a procedure for updating X and Y coordinates. The procedure begins as indicated by start block 172 and proceeds to operation 174 wherein values $X_1$ and $Y_1$ are initialized. $X_1$ and $Y_1$ represent the upper limits of X and Y beyond which, the direction of movement of the overlay needs to be reversed. This calculation is presented here as a separate step to more clearly present the procedure. In actuality however, these values can be calculated using hardware adders each time they are needed. $X_1$ is calculated to equal the width of the display $D_W$ minus the width of the overlay $O_W$ minus $\Delta X$. Likewise, $Y_1$ is calculated to equal the height of the display $D_H$ minus the height of the overlay $O_H$ minus $\Delta Y$. After initializing $X_1$ and $Y_1$, the procedure flows to operation 176, in which it is determined whether X is greater than $X_1$ when $\Delta X$ is greater than zero or X is less than the absolute value of $\Delta X$ when $\Delta X$ is less than zero. If one of these conditions is true, then the procedure flows to operation 178, otherwise, the procedure flows to operation 180.

In operation 178, $\Delta X$ is multiplied by negative one (−1), i.e., if $\Delta X$ is a negative value, it is made positive, and if $\Delta X$ is a positive value, it is made negative. In one embodiment, the values $\Delta X$ and $\Delta Y$ are stored in binary form and are made negative by taking a two's compliment of the original value, in manner known to those skilled in the art. This has the effect of causing the horizontal component of the direction of movement of the overlay image to reverse when hitting the left or right side of the display screen. After multiplying $\Delta X$ by negative one, the procedure flows to operation 180.

In operation 180, it is determined whether Y is greater than $Y_1$ when $\Delta Y$ is greater than zero or Y is less than the absolute value of $\Delta Y$ when $\Delta Y$ is less than zero. If one of these conditions is true, then the procedure flows to operation 182, otherwise, the procedure flows to operation 184. In operation 182, $\Delta Y$ is multiplied by negative one (−1). In one embodiment, this is achieved by making a new $\Delta Y$ value as the two's compliment of the original value, which is stored in binary format. After ΔY is multiplied by negative one, the procedure flows to operation 184, in which ΔX is added to X and ΔY is added to Y. This causes the overlay to be repositioned the next time the display is repainted in operation 156 of FIG. 5. After incrementing the values X and Y in operation 184, the procedure ends as indicated in operation 186.

Figure 7:
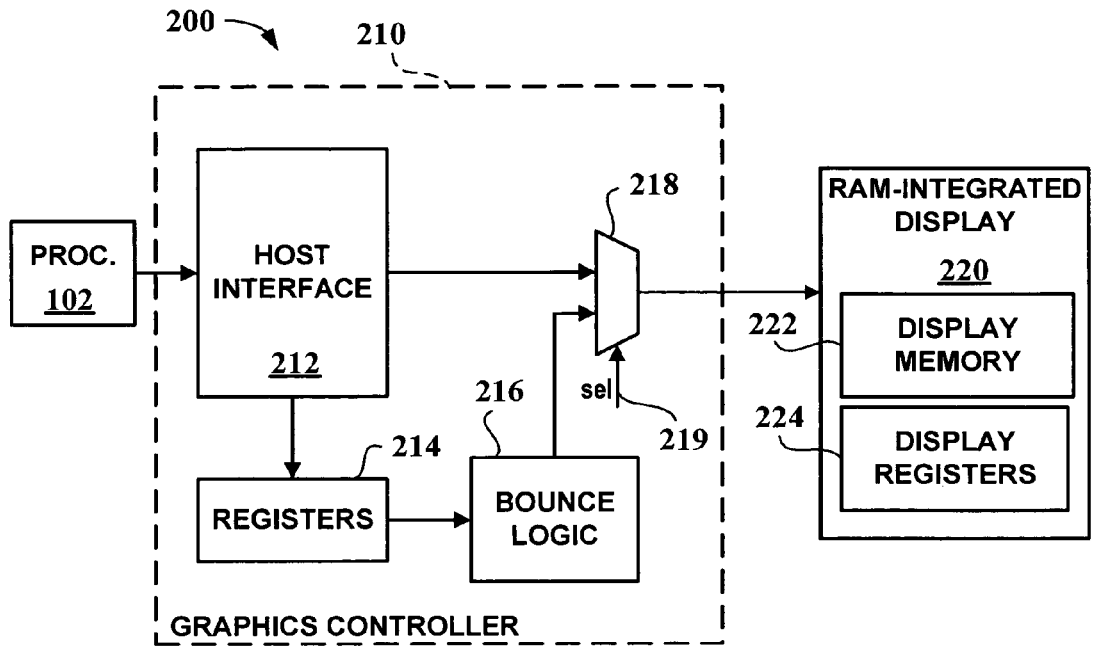
FIG. 7 is an exemplary embodiment of a graphics controller for use with a RAM-integrated display.

FIG. 7 is an exemplary embodiment of a device 200 having a graphics controller 210 intended for use with a RAM-integrated display 220. RAM-integrated display panels have become more common in battery-operated devices. Ram-integrated display 220 contains display memory 222 incorporated into the display unit itself, along with driver circuitry (not shown) and various display registers 224 for controlling how display data, stored in the memory, is presented on the display screen. RAM-integrated display 220 includes support for a background image and overlay image, and contains programmable registers to define where and how the overlay image is presented. Detailed information regarding RAM-integrated display panels may be found in U.S. Pat. No. 6,937,223, issued on Aug. 30, 2005 to Matsuyama and U.S. Pat. No. 6,943,782 issued on Sep. 13, 2005 to Tamura. Both of these patents are hereby incorporated by reference in their entitety.

Graphics controller 210 receives data from processor 102, which is passed by host interface 212 to registers 214 or to RAM-integrated display 220 via multiplexer 218. Registers 214 contain the values discussed above with reference to Table 1. Bounce logic 216 responds to values stored in registers 214 to program display registers 224 to animate the display in the same manner described above with reference to FIGS. 2 and 4. However, since RAM-integrated display 220 manages and drives the display, the painting operation is not required to be executed internal to graphics controller 210.

Figure 8:
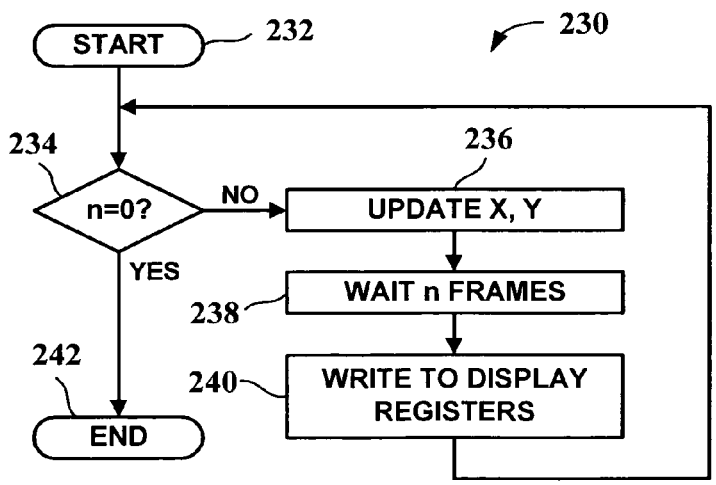
FIG. 8 shows a flowchart illustrating an exemplary procedure for animating a bouncing image using the graphics controller of FIG. 7.

FIG. 8 shows a flowchart 230, illustrating a procedure for animating a bouncing image using graphics controller 210 and bounce logic 216. The procedure begins as indicated by start block 232 and proceeds to operation 234 wherein it is determined if n equals zero. If n equals zero, then no animation is required and the procedure ends as indicated by end block 242. If n does not equal zero, then the procedure flows to operation 236.

In operation 236, the values X and Y are updated. In one embodiment, the values X and Y are updated as described above with reference to FIG. 6. After determining new values for X and Y, the procedure flows to operation 238, in which bounce logic waits n frame refreshes. In one embodiment, bounce logic 238 receives a timing signal (not shown) from RAM-integrated display 220 of FIG. 7, which can be counted until n frame refreshes have elapsed. After n frame refreshes elapse, the procedure flows to operation 240.

In operation 240, the new values X and Y are written to display registers 224. Select signal 219 is changed while writing the new values to display registers so that multiplexer passes the new values to the RAM-integrated panel. In one embodiment, host interface 212 can override the select signal when writing directly to display memory 222 and/or display registers 224 such that the bounce animation may be interrupted during this time. After the new X and Y values are written to display registers 224, the procedure returns to operation 234 to see if the value n has changed to zero. In this way, the processor 102 may change the value n to start and stop the bounce animation.

It will be recognized by those skilled in the art that the procedures outlined above with reference to FIGS. 5, 6, and 8 are performed in hardware using logic gates, and therefore not necessarily sequentially as might be suggested by the flowcharts. Thus, many operations may be performed in parallel and/or in a different order than presented above. Furthermore, as discussed above with reference to operation 174, for example, there may be instances where a particular operation is combined with other operations such that no intermediary state is provided. Thus, in this example, there may be no instance where $X_1$ is calculated, but rather the calculation of $(D_W - O_W - \Delta X)$ is substituted in subsequent operations, i.e., operation 176, where $X_1$ appears. Likewise various operations may be split into multiple steps with one or more intermediary states. Graphics controllers 106 (FIG. 3) and 210 (FIG. 7) and other hardware devices incorporate logic typically designed using a hardware description language (HDL) or other means known to those skilled in the art of integrated circuit design. The generated circuits will include numerous logic gates and connectors to perform various operations and does not rely on software instructions.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A graphics controller, comprising:
   a host interface for communicating with an external processor;
   a plurality of registers in communication with the host interface; and
   logic circuitry, the logic circuitry configured to periodically change coordinates of an overlay image to animate a bouncing image; the logic circuitry responding to values stored in the registers to cause display registers storing the coordinates to be updated every x number of frame refreshes,
   wherein the coordinates include an X coordinate indicating a current horizontal position of the overlay image and a Y coordinate indicating a current vertical position of the overlay image,
   wherein the registers include a ΔX value and a ΔY value, the logic circuitry periodically incrementing the X coordinate by ΔX and the Y coordinate by ΔY,
   wherein ΔX is multiplied by negative one when the overlay image reaches a horizontal edge of a display region of the external display, and ΔY is multiplied by negative one when the overlay image reaches a vertical edge of the display region.

2. The graphics controller of claim 1, further comprising:
   image memory for storing image data, the image data comprising background image data and overlay image data, wherein the background image data defines a background image and the overlay image data defines the overlay image;
   a display pipe for reading the image data; and
   display interface for driving an external display, the display pipe reading display data selected from the background image data and the overlay image data based on the display registers.

3. The graphics controller of claim 1, further comprising:
   a multiplexer selectively placing one of the logic circuitry or the host interface in electronic communication with an external RAM-integrated display panel, the display registers being located in the RAM-integrated display panel.

4. The graphics controller of claim 1, wherein the registers further include an n value, when n is greater than zero, the logic circuitry increments the X and Y coordinates every x frame refreshes, x being equal to n.

5. The graphics controller of claim 4, wherein, when n is zero, the X coordinate and the Y coordinate are not changed.

6. The graphics controller of claim 4, wherein:
the registers further include an $X_0$ value and a $Y_0$ value; and
the logic circuitry initializes the X coordinate to $X_0$ and the Y coordinate to $Y_0$.

7. The graphics controller of claim 4, wherein:
the registers further include values defining a width and a height of the display region and values defining a width and a height of the overlay image.

8. The graphics controller of claim 1, wherein the graphics controller is integrated into a battery operated device incorporating the external processor, the battery operated device further including a graphical display having a two dimensional matrix of pixels.

9. A hardware-implemented method for animating a bouncing image, the method comprising:
reading a plurality of registers containing values defining an animation, the registers including a $\Delta X$ value and a $\Delta Y$ value;
periodically changing coordinates of an overlay image in response to the values, the coordinates including an X coordinate indicating a current horizontal position of the overlay image and a Y coordinate indicating a current vertical position of the overlay image, the coordinates being changed every x number of frame refreshes, the X coordinate being changed by $\Delta X$ and the Y coordinate being changed by $\Delta Y$;
multiplying $\Delta X$ by negative one when the overlay image reaches a horizontal edge of a display region of the external display; and
multiplying $\Delta Y$ by negative one when the overlay image reaches a vertical edge of the display region,
wherein the coordinates of the overlay image are changed to animate a bouncing image on a display.

10. The method of claim 9, further comprising:
storing image data in an image memory, the image data comprising background image data and overlay image data, wherein the background image data defines a background image and the overlay image data defines the overlay image;
reading the image data selectively from the background image data and the overlay image data to generate a composite image wherein the overlay image is positioned at the coordinates over the background image; and
driving an external display via a display interface to display the composite image.

11. The method of claim 9, wherein the display registers are incorporated into a RAM-integrated display panel, the method further comprising passing the coordinates to the display registers via a multiplexer.

12. The method of claim 9, the registers further including an n value, the method further comprising:
incrementing the X coordinate and incrementing the Y coordinate every x frame refreshes, x being equal to n when n is greater than zero.

13. The method of claim 12, wherein, when n is zero, the X coordinate and the Y coordinate are not changed.

14. The method of claim 12, wherein the registers further include an $X_0$ value and a $Y_0$ value, the method further comprising initializing the X coordinate to $X_0$ and the Y coordinate to $Y_0$.

15. The method of claim 12, wherein the registers further include values defining a width and a height of the display region and values defining a width and a height of the overlay image.

16. A method for causing an animation wherein overlay image moves over a background image, the method comprising:
loading background image data into an image memory of a graphics controller, the background image data defining a background image;
loading overlay image data into the image memory of the graphics controller, the overlay image data defining an overlay image;
loading values into a plurality of registers in the graphics controller, the values defining an animation;
reading the plurality of registers, the registers including a $\Delta X$ value and a $\Delta Y$ value;
periodically changing coordinates of the overlay image in response to the values, the coordinates including an X coordinate indicating a current horizontal position of the overlay image and a Y coordinate indicating a current vertical position of the overlay image, the coordinates of the overlay image are changed to animate a bouncing image on a display, the coordinates being changed every x number of frame refreshes, the X coordinate being changed by $\Delta X$ and the Y coordinate being changed by $\Delta Y$;
multiplying $\Delta X$ or $\Delta Y$ by negative one when the overlay image reaches a corresponding edge of a display region of an external display;
reading the image data selectively from the background image data and the overlay image data to generate a composite image wherein the overlay image is positioned at the coordinates over the background image; and
driving the external display via a display interface to display the composite image.

17. The method of claim 16, the registers further including an n value, the method further comprising:
incrementing the X coordinate and incrementing the Y coordinate every x frame refreshes, x being equal to n when n is greater than zero.

18. The method of claim 17, wherein, when n is zero, the X coordinate and the Y coordinate are not changed.

19. The method of claim 17, wherein the registers further include an $X_0$ value and a $Y_0$ value, the method further comprising initializing the X coordinate to $X_0$ and the Y coordinate to $Y_0$.

20. The method of claim 17, wherein the registers further include values defining a width and a height of the display region and values defining a width and a height of the overlay image.

* * * * *